US 6,747,680 B1

(12) United States Patent
Igarashi et al.

(10) Patent No.: US 6,747,680 B1
(45) Date of Patent: Jun. 8, 2004

(54) SPEED-DEPENDENT AUTOMATIC ZOOMING INTERFACE

(75) Inventors: Takeo Igarashi, Chigasaki (JP); Eric Horvitz, Kirkland, WA (US); Kenneth P. Hinckley, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/460,028

(22) Filed: Dec. 13, 1999

(51) Int. Cl.[7] .................................................. G09G 5/00
(52) U.S. Cl. ..................... 345/784; 345/660; 345/764; 345/785; 345/163; 345/159
(58) Field of Search ................................ 345/660, 670, 345/764, 667, 784, 785, 163, 157, 661, 665, 668, 159

(56) References Cited

U.S. PATENT DOCUMENTS

| 5,874,943 A | * | 2/1999 | Fitzpatrick et al. | ......... 345/159 |
| 6,014,142 A | * | 1/2000 | LaHood | ....................... 345/355 |
| 6,154,205 A | * | 11/2000 | Carroll et al. | ............... 345/327 |
| 6,323,878 B1 | * | 11/2001 | Haffey et al. | ............... 345/660 |
| 6,326,970 B1 | * | 12/2001 | Mott et al. | ................... 345/439 |
| 6,333,752 B1 | * | 12/2001 | Hasegawa et al. | .......... 345/764 |
| 6,339,434 B1 | * | 1/2002 | West et al. | ................... 345/667 |

OTHER PUBLICATIONS

B. Bederson, J. Hollan, K. Perlin, et al., Pad++: A Zoomable Graphical Sketchpad for Exploring Alternate Interface Physics, Journal of Visual Languages and Computing, 7, 3–31, 1996.

* cited by examiner

Primary Examiner—Kristine Kincaid
Assistant Examiner—Mylinh Tran
(74) Attorney, Agent, or Firm—Amin & Turocy, LLP

(57) ABSTRACT

The present invention relates to a system and method for navigating through a content or document in a display, wherein as the rate of such navigation increases, the scale of the document decreases. Thus, more of the document is viewable in the display. One method involves receiving an input, such as a user input on an input device which may include a joystick, a mouse, a trackball, or other pointing device. The input is mapped to either a speed of navigation through a content space or scale of the content space while being navigated. The other of speed or scale to which the output was not mapped is determined according to the relationship that scale multiplied by speed equals a constant value. The content space is subsequently navigated based on the speed or scale mapped from the input and the scale or speed is determined.

26 Claims, 8 Drawing Sheets

SPEED-DEPENDENT AUTOMATIC ZOOMING INTERFACE

FIELD OF THE INVENTION

This invention relates generally to interfaces for viewing content, and particularly to a speed-dependent automatic zooming interface for viewing content.

BACKGROUND OF THE INVENTION

A commonplace application for computers and computerized devices is the viewing of content such as web pages, graphic images, maps, word processing documents, etc. For most documents and images, their size is too large to view them in their entirety on a display at full scale, even on relatively large displays. For example, a document of more than one or two pages in length, or an image file having a width greater than 1,024 pixels and a height greater than 768 pixels, is typically not completely viewable at full scale on a typical seventeen-inch monitor.

Most operating systems and application programs therefore have instituted scroll bar and zoom mechanisms for navigating such large documents and images. Scroll bars allow a user to change what part of a document or image is currently viewable on the display. For example, a vertical scroll bar allows a user to navigate a document or image in the vertical direction, while a horizontal scroll bar allows a user to navigate the document or image in the horizontal direction. A user thus is able to change what portion of the document or image is currently viewable on the display by scrolling through the document or image. One common input device, a mouse having a wheel, is particularly well suited for scrolling through the document or image in one direction at a time, by using its wheel.

Using scroll bars to navigate a document or image does not change how much of the document or image is currently viewable on the display, though. The scale of the document remains constant. Therefore, in order to see more or less of a document or image—that is, to change the scale of the document or image—zooming is used. For example, an image may be "zoomed out" so that the entire image is viewable on a display at one time. The trade-off, however, is a loss of visible detail of the image, since the resolution of the display itself remains constant. Thus, at 100% scale, full detail of the image may be visible on the display, but only part of the image is typically viewable, whereas at 25% scale, the entire image may be viewable on the display, but with a loss of visible detail.

Therefore, to quickly navigate a long document or a large image, a common approach is to first zoom out so that the entire document or image is viewable at reduced visible detail, locate the general part of the document or image that is of interest, zoom in on that part, and finally navigate that part to find the exact point of interest. This requires much user input: the user first has to manually invoke a zoom mechanism to zoom out, then perhaps use scroll bars to locate the general part of interest, again use the zoom mechanism to zoom in on this general part, and finally again use the scroll bars to find exactly the point of interest within the document or image.

Many users may therefore simply opt to just stay at full scale, and quickly scroll through the document or image vertically and/or horizontally to locate the exact point of interest by trial and error. For example, within a word processing document, the user may know that the point of interest is located somewhere in the middle of the document. Therefore, the user may scroll down very quickly through the document, such that the document is not readable because of the speed at which the user is moving through it, and occasionally slow down or stop scrolling to determine if further scrolling in the same direction is needed, or if the desired point has in fact been overshot. If overshot, then the user must begin scrolling in the opposite direction. All this continues until the desired point of interest is finally reached.

These and other prior art approaches for navigating a long document or large image thus leave much be desired. They do not allow easy and precise navigation through a long document or large image to quickly locate a desired point within the document or image. For this and other reasons, there is a need for the present invention.

SUMMARY OF THE INVENTION

The invention relates to speed-dependent automatic zooming through content such as documents and images. In one embodiment, a method first receives an input, such as a user input on an input device like a mouse or a trackball. Other input devices amenable to an embodiment of the invention include self-centering input devices, such as self-centering joysticks, levers, etc. The input is mapped to either speed of navigation through a content space, or scale of the content space while being navigated. The other of speed or scale to which the input was not mapped is then determined, based on the relationship that scale times speed equals a constant. The content space is then navigated, based on the speed or scale mapped from the input, and the scale or speed determined.

Embodiments of the invention provide for advantages not found within the prior art. In one embodiment, a single input, such as movement of a mouse, ultimately controls both speed of navigation through a content, and the scale of that content while being navigated. For example, while content is being navigated quickly, the scale of the content is reduced, so the user can still easily get a sense for where he or she is navigating within the content. Then, when the user slows down navigation, the scale of the content automatically is increased, so the user is able to easily particularly locate an exact desired point within the content. This is as compared with the prior art, which requires separate user inputs to control scale of the content while being navigated and speed of navigation through the content.

Furthermore, it is noted that in one embodiment, perceptual benefits are provided for the user. For example, within the prior art, if the user scrolls too fast, the perceptual scrolling speed, which is the visual speed of the document across the screen, becomes too fast to read the document, and the user can become disoriented. However, in an embodiment of the invention, the perceptual scrolling speed remains constant, by controlling the zooming level based on the relationship that scale times speed equals a constant. Thus, the user does not become disoriented within the document.

The invention includes computer-implemented methods, machine-readable media, computerized systems, and computers of varying scopes. Other aspects, embodiments and advantages of the invention, beyond those described here, will become apparent by reading the detailed description and with reference to the drawings.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Operating Environment

Figure 1:
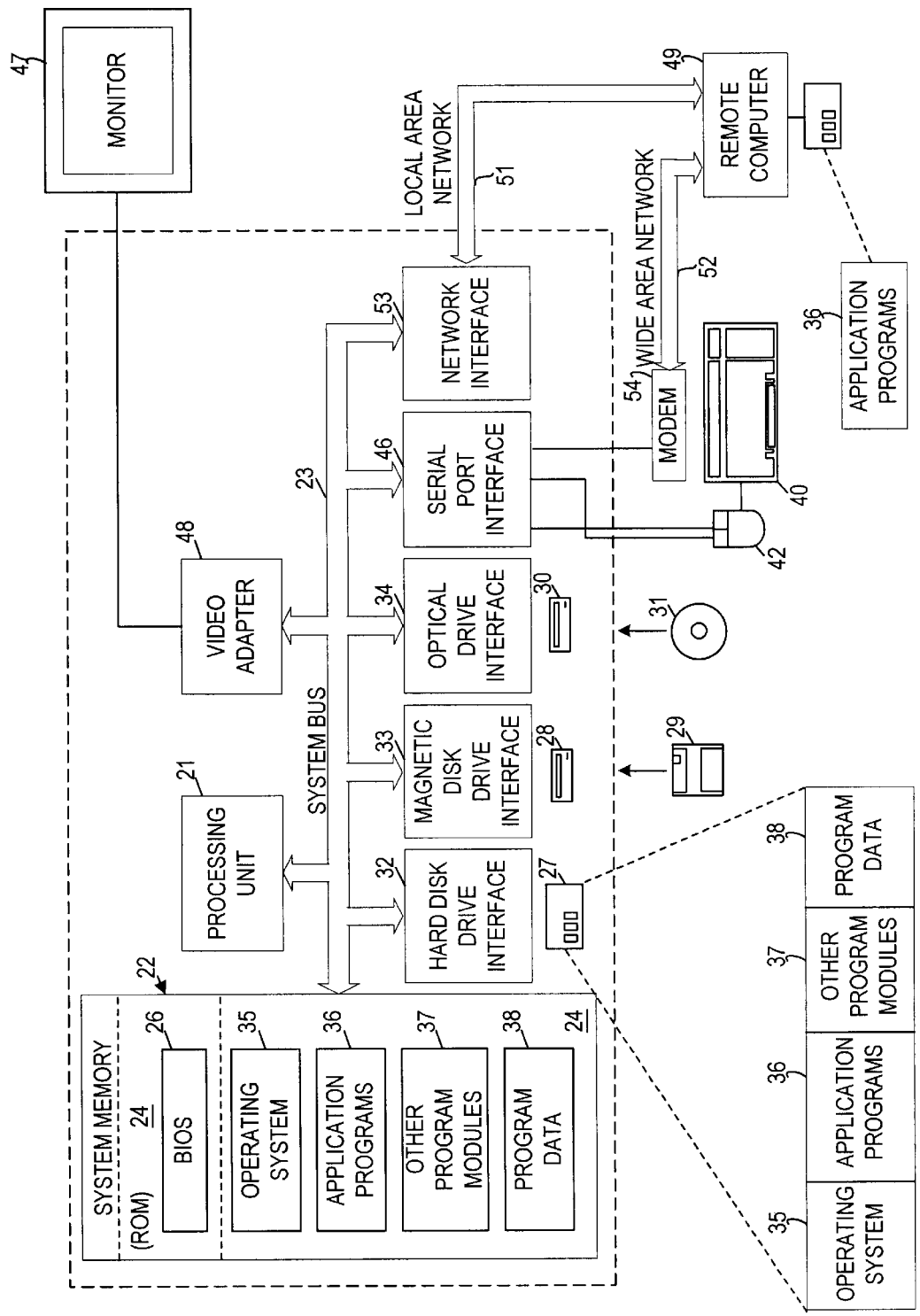
FIG. 1 is a diagram of an operating environment in conjunction with which embodiments of the invention can be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

Operation

In this section of the detailed description, an example of how an embodiment of the invention operates is presented. The invention itself, however, is not limited to this example, and it is presented herein for illustrative purposes only. Specific methods and systems according to varying embodiments of the invention are presented in proceeding sections to describe how an embodiment can achieve the operation described in this section.

In one embodiment of the invention, a singular user input affects both speed of navigation through content, as well as the scale of the content while it is being navigated. Navigation as used herein means movement through the content as viewable on a display. For example, at full scale, only a portion of the content may be viewable on the display, whereas at 25% scale, the entire content may be viewable on the display, or at least more of the content than when it is being viewed at full scale, but with less visible detail.

The speed of navigation refers to the speed at which a visible portion of the content is moved through on the display. In one embodiment, the speed of navigation can be likened to scrolling speed. When content is navigated through very quickly, it is difficult for a user to discern details of the content as they move on the display; conversely, when content is navigated through very slowly, it is easier for a user to discern content details, and much easier still when the content is not moving at all.

The scale of the content is indicative of how much of the document is viewable on the display while it is being navigated. At full scale, all the details of the content are typically visible on the display; however, only a small part of the document is viewable on the display. Reducing scale increases the portion of the document that is viewable on the display, but with a reduction in the visible detail. For example, at full scale, one paragraph of a text document may be viewable on the display, such that all the words of the paragraph are visible. At a lesser scale, one page of the text document may be viewable, but such that the words of the page are smaller, and thus more difficult to discern. At a least scale, all the pages of the text document may be viewable; but likely such that only chapter headings and other larger indicia of the text document are visible. Scale can in one embodiment be likened to resolution of the content; however, that term is not used universally herein so as not to create confusion with the resolution of the display itself, which typically remains constant for a given display.

The invention is not limited to a particular type of content that can be navigated in accordance therewith. Typical types of content include word processing documents, including those containing images and other objects in addition to text, text documents, images in various formats, maps (which are a particular type of image), web pages, etc. Other typical types of documents include spreadsheets, drawings and illustrations, such as those utilizing vector graphics, as well as three-dimensional virtual spaces. That is, embodiments of the invention are applicable to any content that has one or more of a one-dimensional, two-dimensional, or three-dimensional spatial nature.

Some types of documents may have built-in levels of abstraction that are viewable at different scales. For example, a word processing document created using an outline feature of a word processing program may at its highest (full, or 100%) scale have all the words of the document displayed. At a lower scale, chapter and section headings of the document may only be displayed. At a lower scale still, only chapter headings may be displayed. As another example, a map may at full scale have all roads and small towns indicated. At a lower scale, only larger cities and major roads may be indicated. At the lowest scale, only boundaries between states and countries may be shown. Embodiments of the invention are amenable to content that have such built-in levels of abstraction, as well as content which does not. For content which does not, words of a text document may simply appear smaller at lower scales as compared to higher scales, while an image may lose detail as it is displayed at lower scales.

Figure 2:
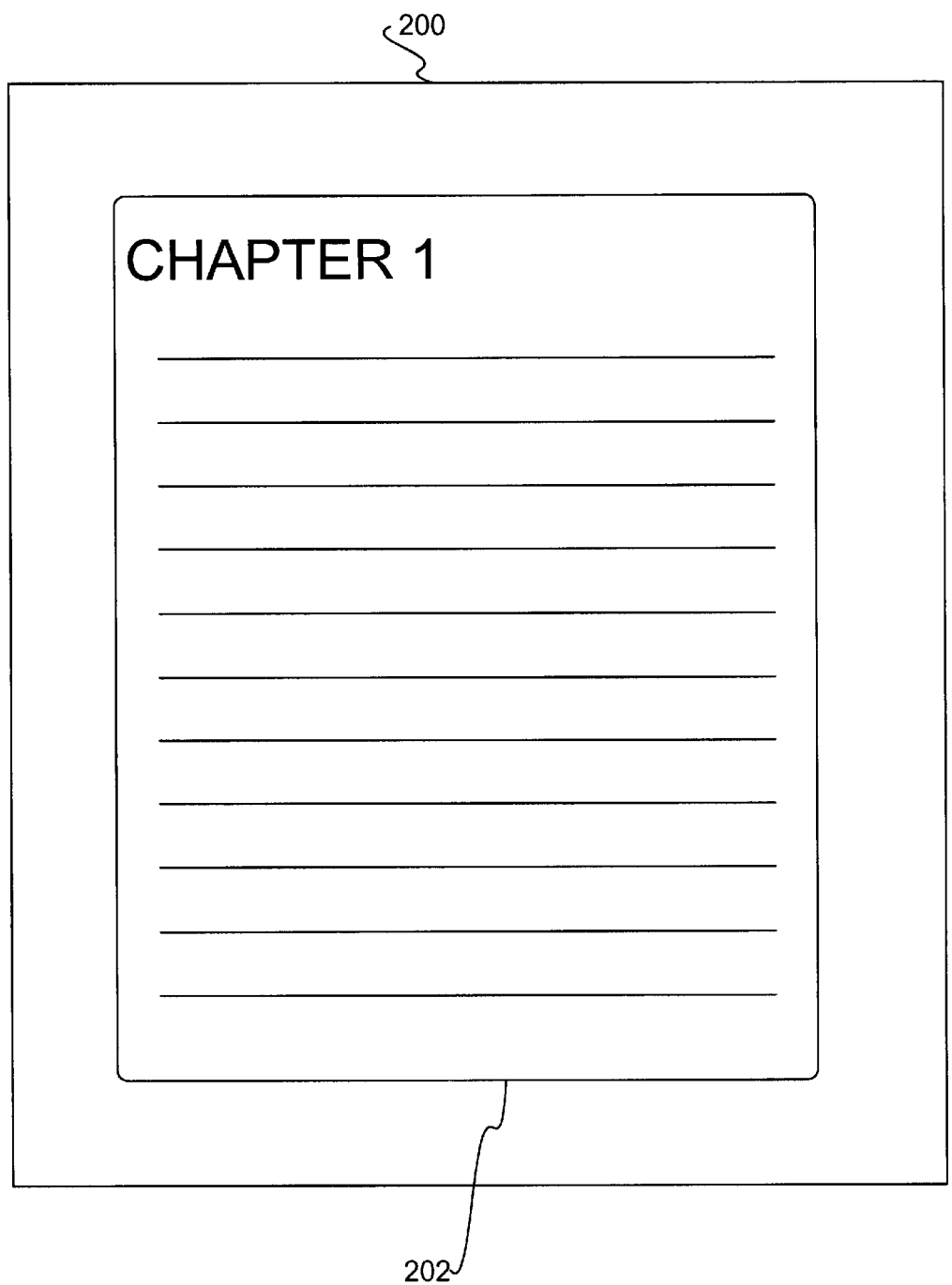
FIGS. 2–4 are diagrams illustrating an example of navigation through content in accordance with an embodiment of the invention.
Figure 3:
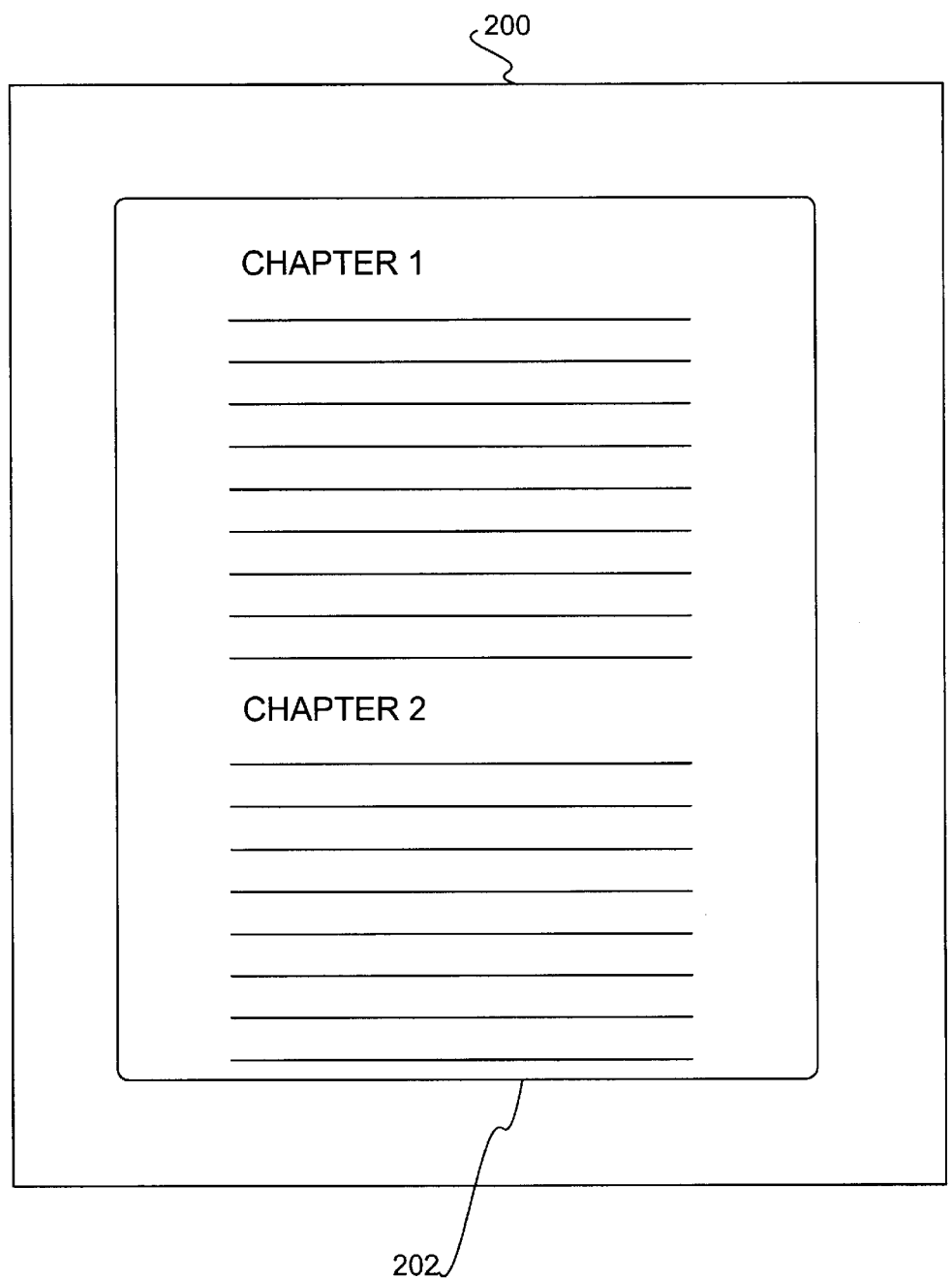
Figure 4:
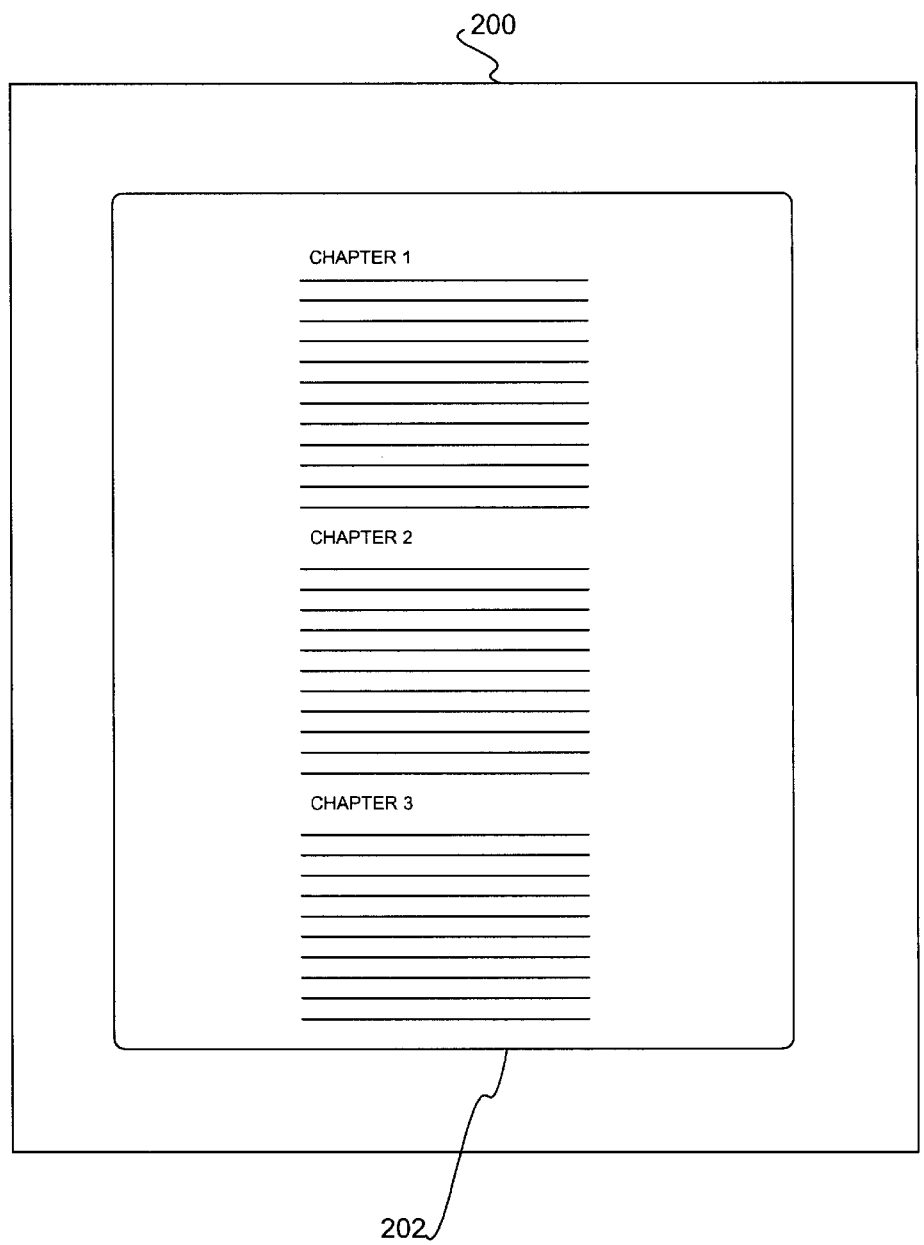

Reference to the diagrams of FIGS. 2–4 is now made. In FIG. 2, on a display 200 a text document is shown as being navigated within a window 202. For purposes of this example, it is assumed that the document is shown at full resolution in FIG. 2. Thus, only a part of the text document is displayed within the window 202; in particular, only the phrase "Chapter 1" and some lines of text are viewable on the window 202 at one time. The user is scrolling slowly through the document. As the user increases the speed of navigation, the scale of the document is automatically reduced, so that more of the document is viewable. This is shown in FIG. 3, where within the window 202 on the display 200 the scale of the text document has been reduced, such that both the phrases "Chapter 1" and "Chapter 2", and more lines of text, are viewable. However, the size of the text has been decreased. When the user increased the speed of navigation even more, the scale of the document is even further automatically reduced. This is shown in FIG. 4, where within the window 202 on the display 200 the scale of the text document has been reduced so that the three phrases "Chapter 1", "Chapter 2" and "Chapter 3", and still more lines of text, are viewable. The size of the text is even smaller, however, so that still more of the document is able to be viewed. That is, the detail of the document has decreased.

Thus, in accordance with an embodiment of the invention, the scale of content as it is being navigated is related to the speed at which the content is being navigated. When the content is being navigated slowly, the scale is higher, such that less of the document is viewable on the display, but at greater detail. When the content is being navigated quickly, the scale is lower, such that more of the document is viewable on the display, but at less detail. For example, a user may navigate very quickly through a text document to find the chapter in which a desired point of interest (a particular paragraph within that chapter, for example) is located. Therefore, the scale automatically is reduced so that more than one chapter heading ("Chapter 1", "Chapter 2", etc.) is viewable on the display at one time—although the text itself of the chapters is likely difficult to discern, as a result of the lost of detail. Once the user has found the chapter in which the desired point of interest is located, he or she can decrease the speed of navigation, causing the scale to automatically be increased. This enables the user to easily discern the text of the desired chapter, to easily locate the desired point of interested therein.

In one embodiment, the user controls either speed or the scale by providing an input, such that the other of the speed or the scale is determined by the relationship speed times scale equals a constant. For example, the user may control either speed or scale via an input device, such as a mouse. When the user presses down on a mouse button, this indicates that the user wishes to activate the automatic zooming interface according to an embodiment of the invention. Thereafter, when the user moves the mouse forward or backward, the scrolling speed of the document changes in accordance with how far the user has moved the mouse. Moving the mouse only a little, for example, corresponds to a slow scrolling speed; moving the mouse a lot corresponds to a fast scrolling speed. Moving the mouse forward as opposed to backward controls the direction of scrolling. Ultimately, the user has affected both speed and scale by his or her singular input. In this example, the user's movement of the mouse a particular distance directly controls the speed of navigation, from which the scale of the document while being navigated is dependently determined. It is noted, however, and as can be appreciated by those of ordinary skill within the art, that the specific use of a mouse pointing device as described herein is only an example of operation of an embodiment of the invention, and the invention itself is not limited to this example.

Figure 5:
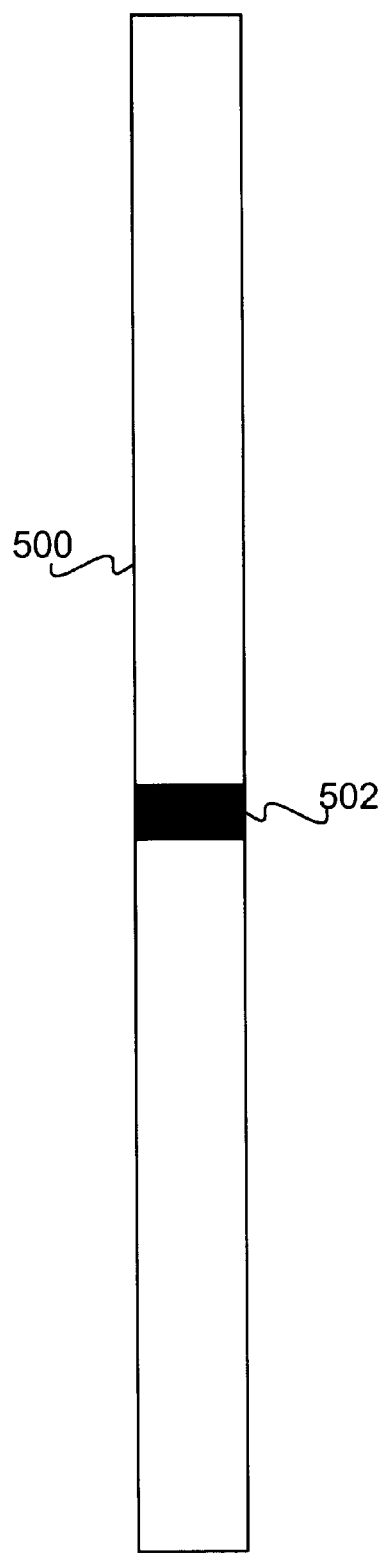
FIG. 5 is a diagram of an indicator that can be used with an embodiment of the invention.

In one embodiment, an indicator appears on the display when the user has activated the automatic zooming interface. Such an indicator is shown in the diagram of FIG. 5. The height of the indicator 500 corresponds to the length of the content being navigated. The bar 502 within the indicator 500 indicates the relative position within the document that is currently being shown on the display. Using an indicator is not required, but is useful in that it provides visual indication when the automatic zooming interface has been activated, as well as to allow the user to see where the viewable part of the document is in relation to the document as a whole.

Furthermore, it is noted that while the example presented herein has been made with reference to one-dimensional content—text which can be navigated from beginning to end and vice-versa—the invention itself is not so limited. For example, in the context of two-dimensional content such as an image, an automatic zooming interface can be activated in accordance with an embodiment of the invention to provide for the inter-relation of scale and speed via a singular user input simultaneously in both the x and y directions. Because an input device such as a mouse or ajoystick provides for movement across two dimensions, such an input device is well suited for use with embodiments of the invention providing for navigation of two-dimensional content such as images.

It is also noted that embodiments of the invention can be applied to a variety of computers and computerized devices. A description of a computer has been provided in the previous section of the detailed description. Types of computers include laptop computers, desktop computers, and handheld computers, also known as personal digital assistants (PDA's). Electronic book devices and other computerized devices are amenable to the invention. A navigation system within a car in which a map is shown on a display is amenable to the invention. In such an embodiment, for example, the input provided can be the speed at which the driver is driving, which is typically under control of the driver by virtue of the force exerted on the gas pedal. Still other computers and computerized devices in addition to those referred to herein are also amenable to embodiments of the invention.

Relating Speed and Scale to an Input

In this section of the detailed description, a specific manner by which speed and scale are inter-related, and affected by an input, such as a user input provided on an input device, such as a pointing device, is described, according to one embodiment of the invention. The invention is not limited, however, to the specific manner described in this section. As has been described in this previous section, the input directly controls one of speed and scale, such that the other is determined based on the relationship that speed times scale equals a constant. This ensures that the perceptual navigation speed remains constant, regardless of the actual navigation speed within the content.

That the input directly controls one of the speed and the scale can be stated that one of the speed and the scale is a function of the input. In one embodiment, the input is a change in position of an input device, such as a pointing device, upon activation of the speed-dependent automatic zooming interface, which can be stated as dy=[y coordinate of the current input device position]−[y coordinate of the position when the interface was activated]. Speed is navigation speed through the content, and scale is the zoom level, where 1 corresponds to the full-scale view, such that the smaller the scale becomes, the smaller the content is on the display (i.e., more of the content is viewable on the display). In one embodiment, either speed or scale is linearly related to the change in position of the input device within a specific range of change in position, whereas in another embodiment, either speed or scale is exponentially related to the change in position of the input device within a specific range.

Figure 6:
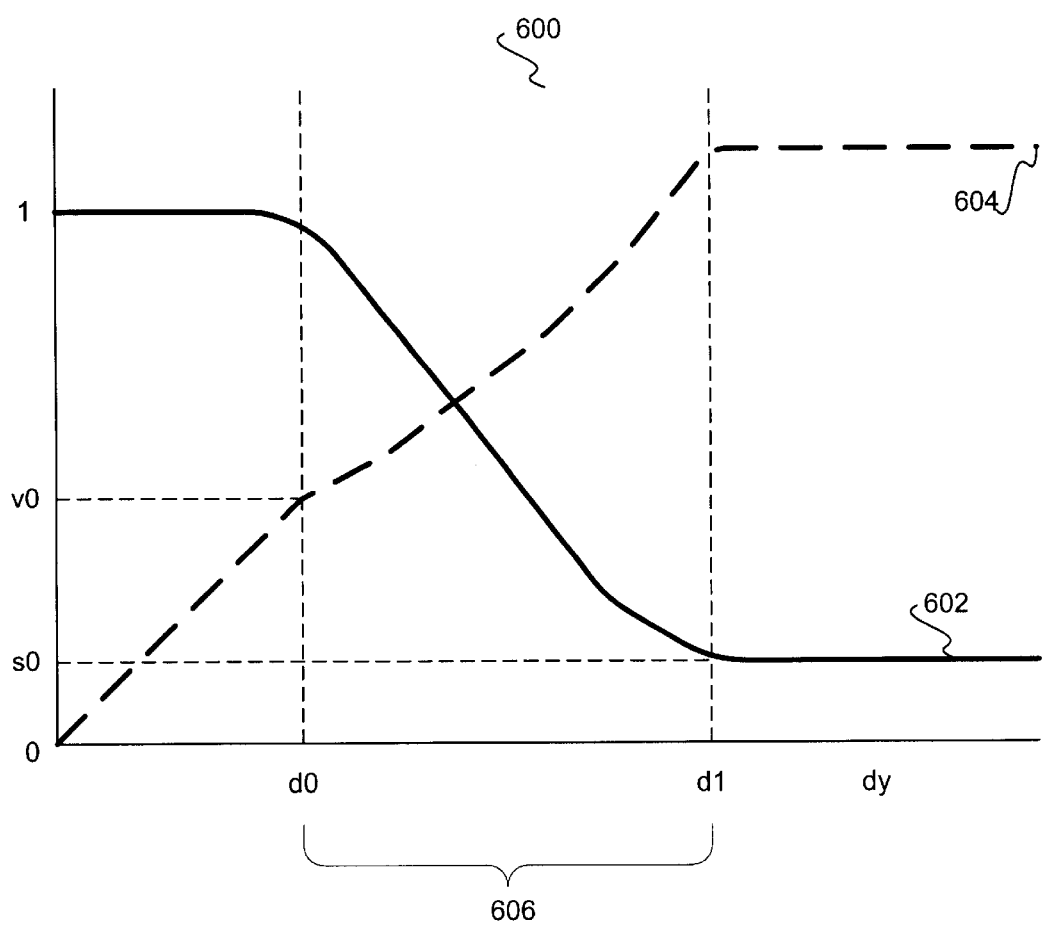
FIG. 6 is a diagram of a graph showing the relationship between scale and speed as affected by input such as a change in position of an input device, such as a pointing device, according to one embodiment of the invention.

Referring now to FIG. 6, a diagram of a graph 600 showing the relationship among speed, scale, and the change in position of the input device, according to one specific embodiment, is shown. The solid line 602 corresponds to scale, while the dotted line 604 corresponds to speed. The range 606 indicates the range in which changes of position affects speed and scale, that is, between d0 and d1. In the embodiment of FIG. 6, scale is specifically directly controlled by the changed in position of the input device when in the range 606, according to the relationship $$scale = s0^{\frac{dy-d0}{d1-d0}}$$

such that the speed is determined from the scale when within the range 606 according to the relationship $$speed = \frac{v0}{scale},$$

where s0 is the starting scale at the beginning of the range 606 (i.e., when dy=d0), and v0 is the starting speed at the beginning of the range 606.

Therefore, as can be seen from the graph 600 of FIG. 6, once the speed-dependent automatic zooming interface is activated, and the user has caused a change in the position of the input device greater than d0, the scale of the content being navigated, identified by the solid line 602, decreases, while the speed of navigation, identified by the dotted line 604, increases. As the user increases movement of the input device away from its initial position, such that its change in position continues to increase, the scale continues to decrease, and the speed continues to increase, until the change in position reaches d1, after which scale and speed remain constant.

It is noted that one drawback of the interface as described in conjunction with the graph of FIG. 6 is that the zoom level (i.e., scale level) substantially changes when the user changes the navigation direction in order to go back to a position that has been passed. That is, in the process of moving the input device to the opposite side of the position where the speed-dependent automatic zooming interface was activated, dy gets closer to 0, causing a sudden zooming effect.

To prevent this situation, in one embodiment a delayed zooming effect is utilized. Zoom level changes at most at a specific maximum rate. If the user moves the input device quickly, thereby requesting a sudden change of zoom (that is, scale) level, the zoom level changes with delay to achieve a smoother transition. In one embodiment, this delay effect is applied only when the target scale as determined by dy is smaller than the current scale. This delay mechanism can also be referred to as a "controlled return" to the target scale.

Furthermore, in one embodiment, speed is set based on dy—a change in distance mapped from the input device, and scale is set as a constant divided by speed. However, this can result in a sudden zoom change at first, and slow change thereafter. Therefore, in one embodiment, scale is set to $e^{dy}$ (that is, the exponential constant e to the dy power), and speed is set to constant divided by scale, to cause a more user-pleasing automatic zooming effect. Furthermore, in another embodiment, this can be expanded to $$scale = C0 \cdot e^{|C1 \cdot dy|}$$

$$speed = \frac{C2}{scale} sign(dy)$$

where sign is +1 if dy is non-negative (i.e., positive or zero), and is −1 if dy is negative. In this embodiment of the invention, scale times speed equals a function of dy, that is, a function of movement of the input device. The invention is not limited to the function listed above, however. That is, more generally, $$scale \cdot speed = f(dy)$$

in some embodiments of the invention. It is noted that this reduces to the specific case already described, where scale times speed equals a constant, where the function of dy is a constant. That is, f(dy)=k, where k is the constant.

Methods

In this section of the detailed description, methods according to varying embodiments of the invention are described. The methods can be utilized to achieve a speed-dependent automatic zooming interface as has been described in a preceding section of the detailed description, in accordance with, for example, the graph described in the immediately previous section, in one embodiment. In some embodiments, the methods are computer-implemented. The computer-implemented methods can be realized at least in part as one or more programs running on a computer—that is, as a program executed from a computer-readable medium such as a memory by a processor of a computer, such as the computer shown in and described in conjunction with FIG. 1. The programs are desirably storable on a machine-readable medium such as a floppy disk or a CD-ROM, for distribution and installation and execution on another computer.

Figure 7:
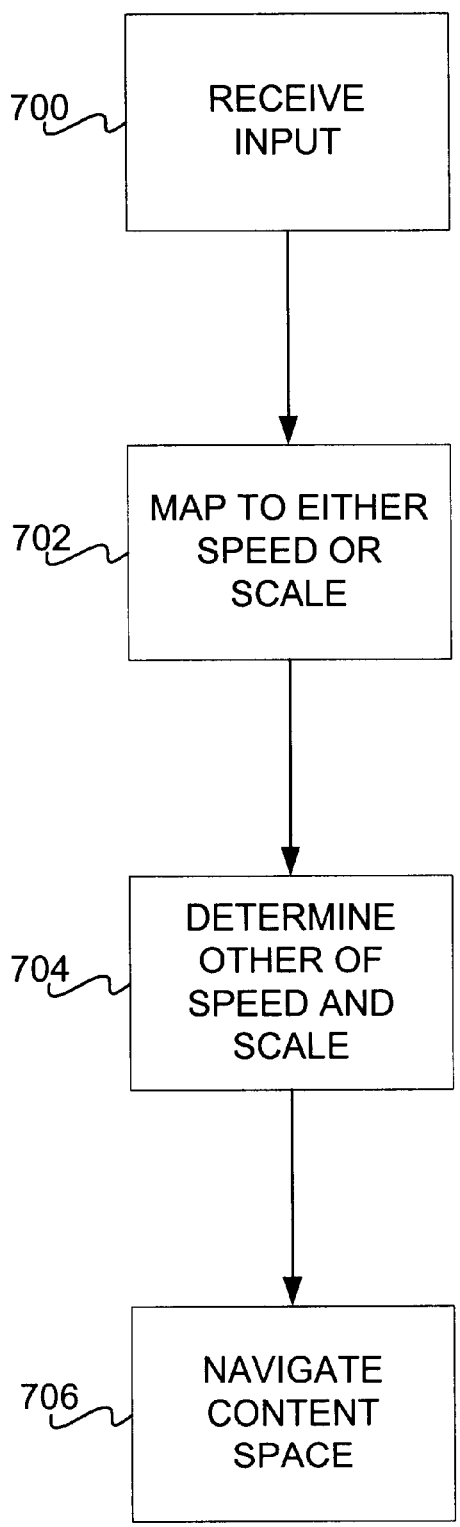
FIG. 7 is a flowchart of a method according to an embodiment of the invention; and, FIG. 8 is a diagram of a system according to an embodiment of the invention.

Referring to FIG. 7, a flowchart of a method according to an embodiment of the invention is shown. In 700, an input is received. For example, the input can be a user input, such as a user input as asserted via an input device, such as a pointing device. The input device can be any type of input device, such as a self-centering joystick, a mouse, a mouse wheel, a joystick, a trackball, a touchpad, and a pointstick, although the invention itself is not limited to the list of input devices recited herein.

In 702, either speed of navigation through a content space—that is, through content—or scale of the content space while being navigated is mapped from the input. This can be in accordance with the graph of FIG. 6, as described in the previous section of the detailed description. In one embodiment, the input is mapped to scale, either linearly or exponentially; in another embodiment, the input is mapped to speed, also either linearly or exponentially. The invention is not limited to a particular type of content space; that is, it is not limited to a particular type of content. Types of content include word processing documents, maps, text documents, images, and web pages, although the invention itself is not limited to the list of content space recited herein. In one embodiment, the input is mapped to either scale or speed such that the scale or speed has a maximum rate of change in reflecting the input, as described in the previous section of the detailed description.

In 704, the other of speed and scale to which the input was not mapped is determined based on the relationship speed times scale equals a constant. For example, where speed was mapped directly from the input in 702, then in 704 the scale is determined based on this relationship. As another example, where scale was mapped directly from the input in 702, then in 704 the speed is determined based on this relationship. Finally, in 706, the content space is navigated, based on the speed and scale as mapped and determined in 702 and 704.

It is noted that other input devices that are amenable to embodiments of the invention include self-centering input devices, such as self-centering joysticks, and levers. For example, in such devices, the position, or angle, of the device is mapped to either speed or scaling, as has been described. When the user releases the device, or otherwise returns the device to its center or original position, the scrolling stops, and the zoom level returns to its original level. Furthermore, speed can be made proportional to the force exerted on a self-centering isometric joystick, for example.

Such self-centering input devices provide for certain advantages. For example, the user can feel the current speed and/or scale, by touch, in that the device gives intuitive feedback, which may not be possible with a device such as a mouse. Furthermore, the user can stop scrolling and return to the original scale simply by releasing the device, such as the stick of the joystick. The physical set up for such devices is thus consistent with the behavior of embodiments of the invention.

Other input devices that are amenable to embodiments of the invention include device buttons, keyboard keys, etc. For example, in such an embodiment, pressing and holding down a first button can cause the speed to gradually increase, and the view to zoom out, while releasing the button causes scrolling to stop, and the zoom level to return to its original level. Such an embodiment may be particularly useful for a personal-digital-assistant (PDA) or other hand-held device, for example.

Systems

Figure 8:
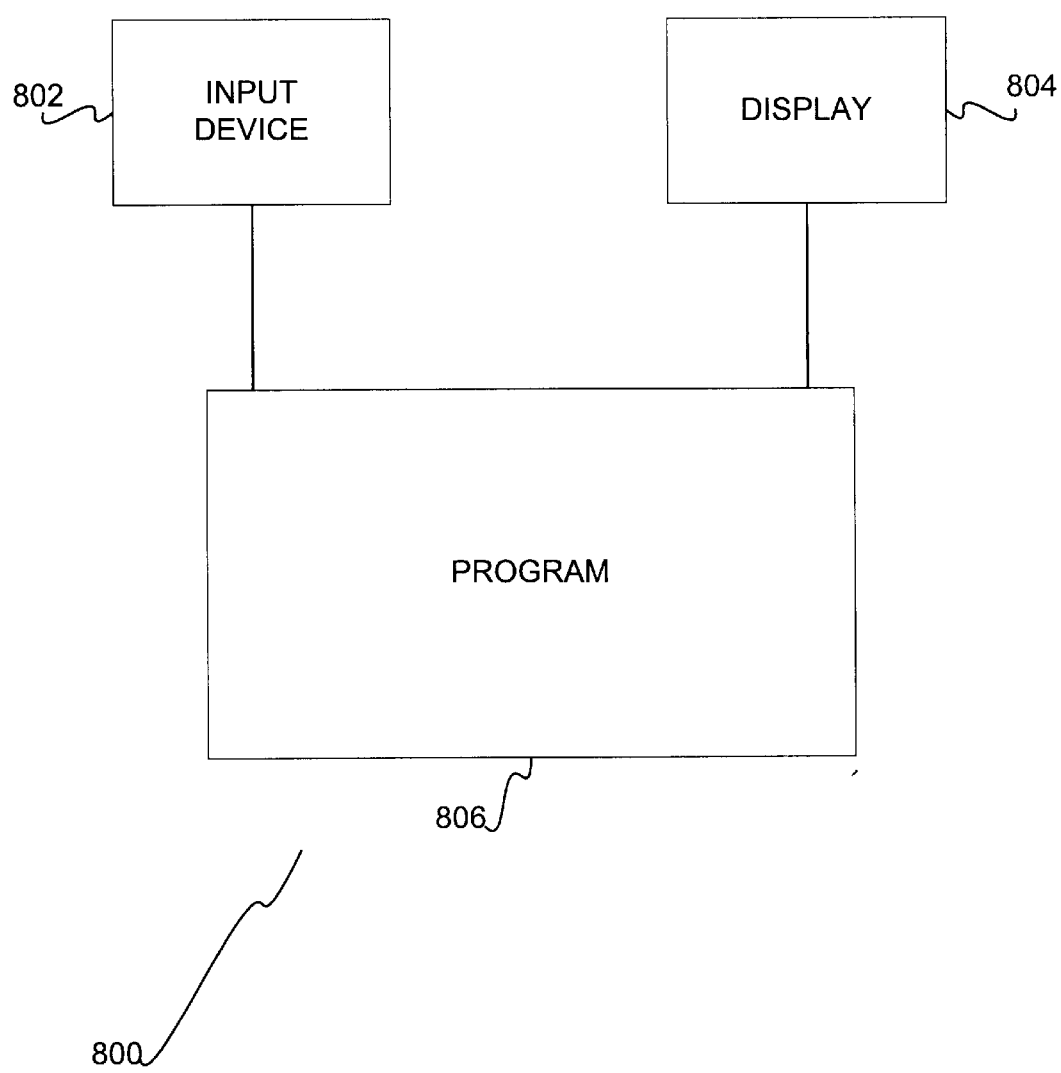

In this section of the detailed description, systems according to varying embodiments of the invention described. Referring to FIG. 8, a diagram of a system according to a specific embodiment is shown. The system 800 includes an input device 802, a display 804, and a computer program 806. The input device 802, such as a pointing device, has at least an output based on a singular user input. For example, the output may be based on the user moving the input device 802 over a planar surface, which corresponds to a singular user input, and which is the case when the input device 802 is a mouse. The output may also be based on a user rotating the input device 802 on a fixed axis, which corresponds also to a singular user input, and which is the case when the input device 802 is a wheel of a mouse. There may be more than one output of the input device 802, such as is the case where a mouse can be moved over a planar surface (first output), has a rotatable wheel (second output), and two mouse buttons (third and fourth output). As described in accordance with FIG. 8, the system is concerned only with one output of the input device 802, based on a singular user input. The display 804 can be a flat-panel display, for example, a cathode-ray tube, etc.; the invention is not so limited. The display 804 is such that navigation of a content space is shown thereon.

The computer program 806 is designed to receive the singular user input as output from the input device 804, and to show the navigation of the content space on the display 804 such that it has speed of navigation and scale while being navigated based only a user input comprising the singular user input. That is, both the speed and scale are based on the singular user input. For example, in one specific embodiment, the scale can be mapped from the user input to the scale of the content space while being navigated, and the speed of navigation through the content space can be determined based on the relationship that scale times speed equals a constant. In the sense that the scale is mapped from the singular user input, and the speed is determined from the scale, both the scale and the speed are based on the singular user input. That is, one input does not control only speed, while another input does not control only scale; rather, a single input affects both speed and scale.

In one particular embodiment, the user input is mapped to scale exponentially or linearly, while in another particular embodiment, the user input is mapped to the scale such that it has a maximum rate of change in reflecting the user input. In another embodiment, speed of navigation is mapped from the user input, and the scale is determined from the speed based on the relationship that speed times scale equals a constant. The content space being navigated is not limited by the invention, it can include, for example, a word processing document, a map, a text document, an image, a web page, etc. The computer program 806 in one embodiment is executed from a computer-readable medium such as a memory or a hard disk drive by a processor. In one particular embodiment, the program 806 corresponds to a means for receiving the singular user input, and for showing the navigation of the content space as having speed of navigation and scale while being navigated based only on the singular user input.

Conclusion

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the claims and equivalents thereof.

We claim:

1. A computer-implemented method comprising:
   receiving an input;
   displaying a content space on a GUI;
   mapping the input to one of speed of navigation through the content space and scale of the content space while being navigated;
   determining the other of speed and scale based on scale times speed equaling a constant; and
   navigating the content space based on the one of speed and scale mapped from the input and the other of speed and scale determined as based on scale times speed equaling a constant.

2. The method of claim 1, wherein receiving an input comprises receiving a user input.

3. The method of claim 2, wherein receiving a user input comprises receiving the user input via an input device.

4. The method of claim 3, wherein receiving the user input via an input device comprises receiving the user input via the input device selected from the group comprising: at least one button, at least one key, a mouse, a mouse wheel, a joystick, a self-centering input device, a self-centering joystick, a lever, a trackball, a touchpad, and a pointstick.

5. The method of claim 1, wherein mapping the input to one of speed and scale comprises mapping the input to scale.

6. The method of claim 5, wherein mapping the input to scale comprises mapping the input to scale exponentially.

7. The method of claim 5, wherein determining the other of speed and scale based on scale times speed equaling a constant comprises determining speed based on scale times speed equaling the constant.

8. The method of claim 5, wherein mapping the input to scale comprises mapping the input to scale such that the scale has a maximum rate of change in reflecting the input.

9. The method of claim 1, wherein navigating the content space comprises navigating one of: a word processing document; a map; a text document; an image; a web page; a spreadsheet; a drawing; an illustration; a vector graphics-based drawing; a vector-graphics-based illustration; a three-dimensional virtual space; content having a one-dimensional spatial nature; content having a two-dimensional spatial nature; and, content leaving a three-dimensional spatial nature.

10. A machine-readable medium having instructions stored thereon for execution by a processor to perform a method comprising:

receiving an input;

displaying a content space on a GUI;

mapping the user input to scale of the content space while being navigated;

determining a speed of navigation through a content space based on scale times speed equaling a constant; and navigating the content space based on the scale mapped from the user input and the speed determined as based on scale times speed equaling a constant.

11. The medium of claim 10, wherein receiving a user input comprises receiving the user input via an input device.

12. The medium of claim 10, wherein mapping the input to scale comprises mapping the input to scale exponentially.

13. The medium of claim 10, wherein mapping the input to scale comprises mapping the input to scale such that the scale has a maximum rate of change in reflecting the input.

14. The medium of claim 10, wherein navigating the content space comprises navigating one of: a word processing document; a map; a text document; an image; a web page; a spreadsheet; a drawing; an illustration; a vector graphics-based drawing; a vector-graphics-based illustration; a three-dimensional virtual space; content having a one-dimensional spatial nature; content having a two-dimensional spatial nature; and, content having a three-dimensional spatial nature.

15. A computerized system comprising:

an input device having at least an output based on a singular user input;

a display means for displaying a content space on a GUI;

a display on which navigation of the content space is shown;

a mapping means for mapping the user input to scale of the content space while being navigated and to determine speed of navigation through the content space based on scale times speed equaling a constant;

a mapping means for mapping the user input to speed of navigation through the content space and to determine scale of the content space while being navigated based on scale times speed equaling a constant; and, a computer program designed to receive the singular user input and show the navigation of the content space having speed of navigation and scale while being navigated based only on a user input comprising the singular user input.

16. The system of claim 15, wherein the input device comprises a pointing device.

17. The system of claim 15, further comprising a processor and a computer-readable medium, such that the computer program is executed by the processor from the computer-readable medium.

18. The system of claim 15, wherein the computer program is further designed to map the user input to scale exponentially.

19. The system of claim 15, wherein the computer program is further designed to map the user input to scale such that the scale has a maximum rate of change in reflecting the user input.

20. The system of claim 15, wherein the content space comprises one of: a word processing document; a map; a text document; an image; a web page; a spreadsheet; a drawing; an illustration; a vector graphics-based drawing, a vector-graphics-based illustration; a three-dimensional virtual space; content having a one-dimensional spatial nature; content having a two-dimensional spatial nature; and, content having a three-dimensional spatial nature.

21. A machine-readable medium having instructions stored thereon for execution by a processor to transform a general-purpose computer to a special-purpose computer comprising:

an input device having at least an output based on a singular user input;

a display means for displaying a content space on a GUI;

a display on which navigation of the content space is shown;

a mapping means for mapping the user input to scale of the content space while being navigated and to determine speed of navigation through the content space based on scale times speed equaling a constant;

a mapping means for mapping the user input to speed of navigation through the content space and to determine scale of the content space while being navigated based on scale times speed equaling a constant; and, means for receiving the singular user input and for showing the navigation of the content space having speed of navigation and scale while being navigated based only on a user input comprising the singular user input.

22. A computer-implemented method comprising:

receiving an input;

mapping the input to one of speed navigation through a content space and scale of the content space while being navigated;

determining the other of speed and scale based on scale times speed equaling a function of the input; and, navigating the content space based on the one of speed and scale mapped from the input and the other of speed and scale determined as based on scale time speed equaling a function of the input.

23. The method of claim 22, wherein receiving an input comprises receiving a user input.

24. The method of claim 23, wherein receiving a user input comprises receiving the user in put via an input device.

25. The method of claim 24, wherein receiving the user input via an input device comprises receiving the user input via the input device selected from the group comprising: at least one button, at least one key, a mouse, a mouse wheel, a joystick, a self-centering input device, a self-centering joystick, a lever, a trackball, a touchpad, and a pointstick.

26. The method of claim 22, wherein navigating the content space comprises navigating one of: a word processing document; a map; a text document; an image; a web page; a spreadsheet; a drawing; an illustration; a vector-graphics-based drawing; a vector-graphics-based illustration; a three-dimensional virtual space; content having a one-dimensional spatial nature; content having a two-dimensional spatial nature; and, content having a three-dimensional spatial nature.

* * * * *